United States Patent [19]

Harrison et al.

[11] 3,750,436

[45] Aug. 7, 1973

[54] FORGING CONTROL

[75] Inventors: Robert Henry Harrison, Sheffield; John Patrick Russell, Unstone, Near Sheffield; Anthony Edward Middleton, Sheffield, all of England

[73] Assignee: Davy and United Engineering Company Limited, Yorkshire, England

[22] Filed: Aug. 24, 1971

[21] Appl. No.: 174,363

[30] Foreign Application Priority Data
Sept. 3, 1970  Great Britain................... 42,219/70

[52] U.S. Cl.............................. 72/8, 72/24, 72/421
[51] Int. Cl........................ B21b 37/12, B21d 43/02
[58] Field of Search .................... 72/8, 11, 12, 421, 72/21, 22, 23, 24

[56] References Cited
UNITED STATES PATENTS

| | | | |
|---|---|---|---|
| 3,590,616 | 7/1971 | Schumier............................... | 72/21 |
| 3,504,512 | 4/1970 | Knowles.................................. | 72/22 |
| 3,435,650 | 4/1969 | Forster................................... | 72/24 |

FOREIGN PATENTS OR APPLICATIONS

1,057,026  2/1967  Great Britain......................... 72/11

*Primary Examiner*—Charles W. Lanham
*Assistant Examiner*—Robert M. Rogers
*Attorney*—Holcombe, Wetherill & Brisebois

[57]  ABSTRACT

Method and apparatus for forging a workpiece in a series of press squeezes displaced along the length of the workpiece, in which the workpiece is carried by a manipulator peel which can be driven longitudinally relative to the manipulator carriage which has an intermittently operable longitudinal drive, and in which the carriage is driven towards or away from the press through the bite distance within the press cycle time, the peel is driven, during the period in which the workpiece is free of the press, relative to the carriage and in the same direction as the carriage to have a speed relative to ground higher than the carriage speed, the movement of the peel relative to ground is monitored, the drive of the peel in that direction being terminated when the peel has traversed the bite distance, and then the peel is held stationary relative to ground until the next press free period.

9 Claims, 13 Drawing Figures

FORGING CONTROL

This invention relates to a forging installation comprising a forging press, a manipulator for supporting and moving a workpiece, and a control system for integrating the movements of the manipulator with the operations of the press.

A forging manipulator is a vehicle for supporting and manipulating a workpiece during a forging operation on the workpiece. The vehicle normally consists of a carriage, which may be rail-bound, carrying a peel which has a pair of jaws for gripping one end of the workpiece. The peel can be moved relative to the carriage in the longitudinal direction, i.e., parallel to the movement of the carriage, vertically and rotationally. The forging is effected in a series of press cycles, in each of which the workpiece is gripped and forged to the required dimension over a part only of the length of the workpiece. After each squeeze, or series of squeezes, the workpiece is moved longitudinally by the manipulator to present a different part of the workpiece to the press. The press cycle time is the period between the initiations of the closing movement of the press in successive press cycles. Within this period, the press must close and effect the squeeze, the press opened to release the workpiece, and the workpiece accelerated to move it longitudinally through the required bite distance before the press recloses.

The manipulator is a massive vehicle and it is possible to accelerate the manipulator and workpiece sufficiently quickly to avoid prolonging the press cycle time, only by providing an excessively powerful drive. It has therefore been suggested to drive the manipulator carriage at a constant speed such that it moves through the bite distance in the press cycle time; during such time as the workpiece is gripped by the press, the peel "free floats," and is caused to return to a datum position relative to the carriage as soon as the workpiece is released. This recoil of the peel may be caused by springs acting between the peel and carriage, but it is preferable to drive the peel by hydraulic rams or the like.

In the previous suggestion, the peel has been simply returned to a datum position on the carriage and then moved with the carriage speed until the workpiece has been traversed through the bite distance. In view of the relatively slow carriage speed, this may involve delays in completing the workpiece movement and cause lengthening of the press cycle time. Further, it is necessary for the operator to control the manipulator carriage speed to a value exactly equal to that required to cause the manipulator to move through the bite distance in the press cycle time, even though the latter is dependant upon the particular values selected for penetration and bite of the tools on the workpiece.

In the present invention, the peel is driven through the bite distance independently of the carriage. As the whole bite distance is accomplished at the high peel speed, the forge free time may be reduced and the forge cycle time correspondingly lessened. The carriage may start and finish its movement through the bite distance outside the forge free period and the carriage speed is not critical, the only requirement being that the bite distance can be traversed by the peel within the cycle time.

Thus, a first aspect of the invention resides in a method of forging a workpiece in a series of press squeezes displaced along the length of the workpiece, in which the workpiece is carried by a manipulator peel which can be driven longitudinally relative to the manipulator carriage which has an intermittently operable longitudinal drive, and in which the carriage is driven towards or away from the press through the bite distance within the press cycle time, the peel is driven, during the period in which the workpiece is free of the press, relative to the carriage and in the same direction as the carriage to have a speed relative to ground higher than the carriage speed, the movement of the peel relative to ground is monitored, the drive of the peel in that direction being terminated when the peel has traversed the bitedistance, and then the peel is held stationary relative to ground until the next press free period.

According to a second aspect of the invention, a forging installation comprises a forging press, a manipulator and a control system, the manipulator including a carriage, an intermittently operable drive for the carriage, a peel carried by the carriage and a drive for moving the peel longitudinally relative to the carriage, the control system including means for measuring the movement of the carriage and means for measuring the movement of the peel relative to the ground, and being arranged to energise the carriage drive to drive the carriage through the required bite distance in each press sycle, to energise the peel drive to drive the peel in the same direction as the carriage but at a higher speed, through the bite distance relative to the ground during the period of each press cycle during which the workpiece is free of the press, and otherwise to keep the peel substantially stationary relative to the ground.

The invention will be more readily understood by way of example from the following description of a forging installation and method of forging in accordance therewith, reference being made to the accompanying drawings, in which.

Figure 1:
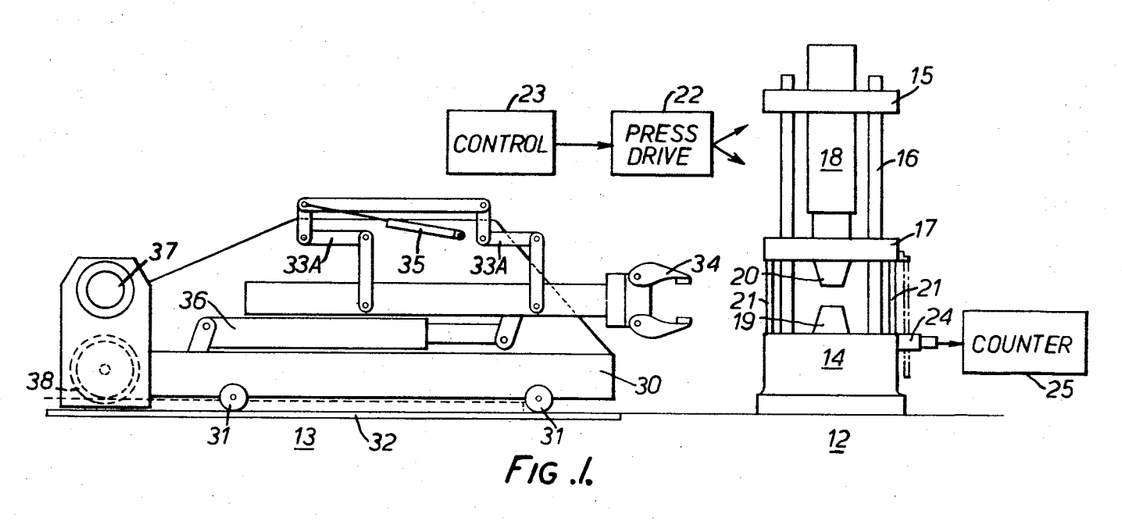
FIG. 1 illustrates a forging press and manipulator, FIGS. 2A, 2B and 2C together form a block diagram of a control system for controlling the press and manipulator.

The forging installation is represented schematically in FIG. 1 by a forging press 12 and a manipulator 13 for supporting and manipulating workpieces during forging. The press 12 is shown as having a fixed base 14, a fixed crosshead 15 mounted on four columns 16, and a moving crosshead 17 which slides on the columns 16. The fixed crosshead 15 carries the pressing ram 18. A fixed lower tool, or anvil, 19 is supported on the base 14, while the moving crosshead 17 carries a top tool 20. The press also has return cylinders 21 for raising the crosshead 17. The press ram 18 and the return cylinders 21 are supplied with liquid from a press drive 22 under the control of the control circuit 23. A pulse generator 24 connected between the base 14 and the crosshead 17 generates a pulse for each unit movement of the crosshead 17 and applies the pulses to a bi-directional counter 25, the count of which is increased during movement of the crosshead 17 away from the base 14, and decreased during the opposite crosshead movement.

The manipulator 13 consists of a carriage 30 mounted on wheels 31 which run on rails 32. The carriage 30 supports a peel 33 on links 33A, the peel having jaws 34 for gripping the workpiece. The height of the peel 33 can be varied by a ram 35 and its longitudinal position relative to the carriage 30 is adjusted by a piston and cylinder unit 36. The carriage 30 is driven longitudinally by a hydraulic motor 37 driving a pinion 38 which meshes with a rack between the rails 31. The piston unit 36 is coupled with a peel position transducer 40 (FIGS. 2 and 3), while the hydraulic motor 37 is coupled to a carriage digitiser 41 which emits a pulse on each unit movement of the carriage.

Figure 3:
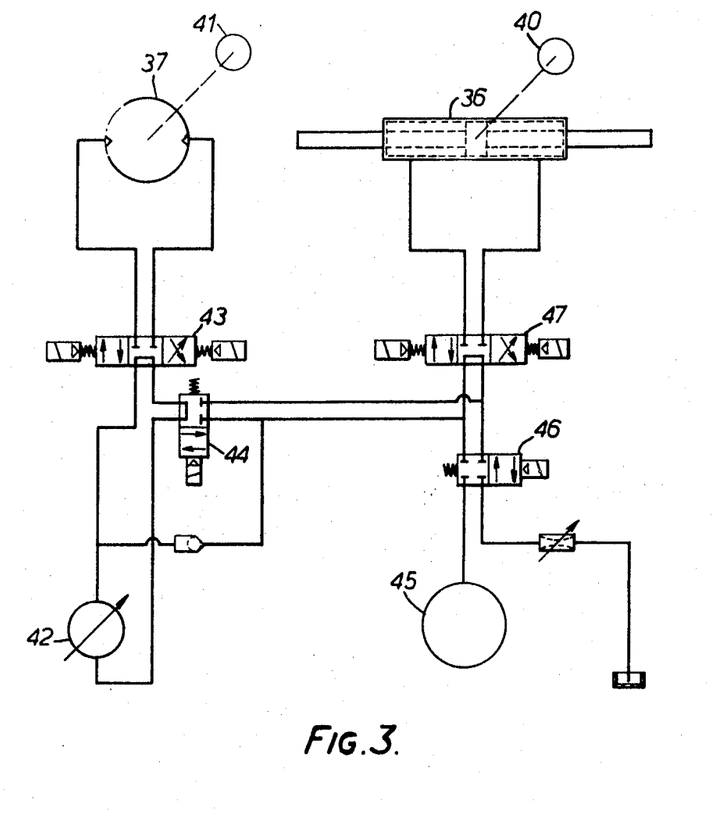
FIG. 3 shows the hydraulic circuit of the manipulator.

The control shown in FIG. 3 of the hydraulic motor 37 and the unit 36 has been described in detail in application Ser. No. 132,719 which issued as U.S. Pat. No. 3,696,651 on Oct. 10, 1972 to Robert H. Harrison and which has been assigned to the same assignes as the present case. For the present purposes, it is sufficient to state that a variable delivery pump 42 supplies the hydraulic motor 37 through a direction valve 43 and a second valve 44. The piston and cylinder unit 36 has its own hydraulic power source 45, which is connnected through a recoil valve 46 and a second direction valve 47 to the cylinder on opposite sides of the piston. There are two modes of operation:

1. Valves 43, 47 are energised in the appropriate direction of movement, valve 44 is energised and valve 46 remains in the position shown. In this condition the two hydraulic actuators — the motor 37 and the unit 36 — are connected in series with the pump 42 and, as a result, the peel 33, connected to the piston rod, is driven at the same speed as, but in the opposite direction to, the movement of the carriage 30, so that the peel remains stationary in space.

2. In this mode, valve 46 is actuated, while valve 44 is returned to the position shown, valves 43, 47 remaining in the energised condition appropriate to the direction of movement. In this case, the liquid from pump 42 does not pass to the unit 36, and the source 45 is connected in parallel with the unit 36 and the motor 37. The peel 33 is now driven from the source 45 and the carriage is given an equal acceleration to counteract the peel acceleration reaction.

Figure 2A:
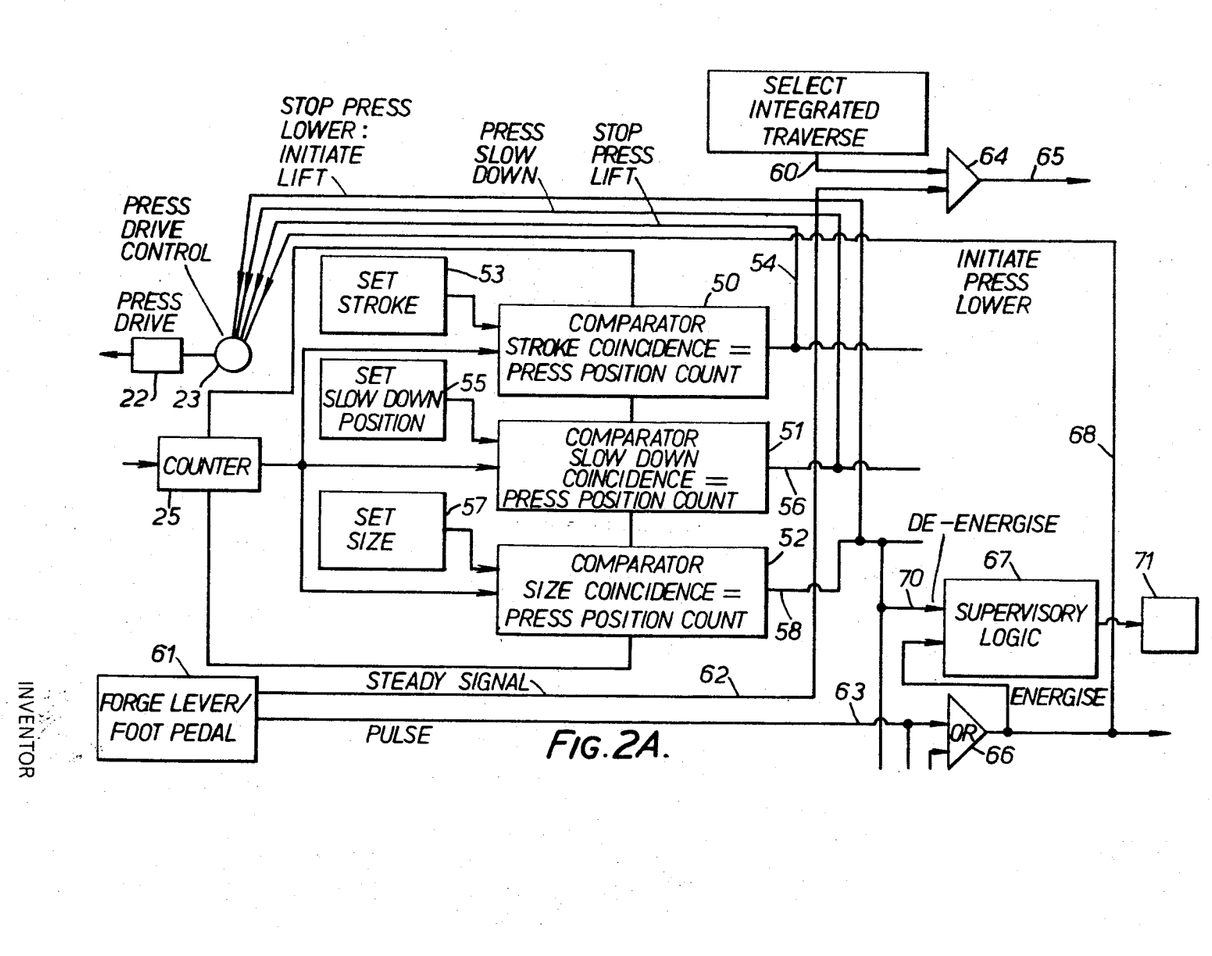
Figure 2B:
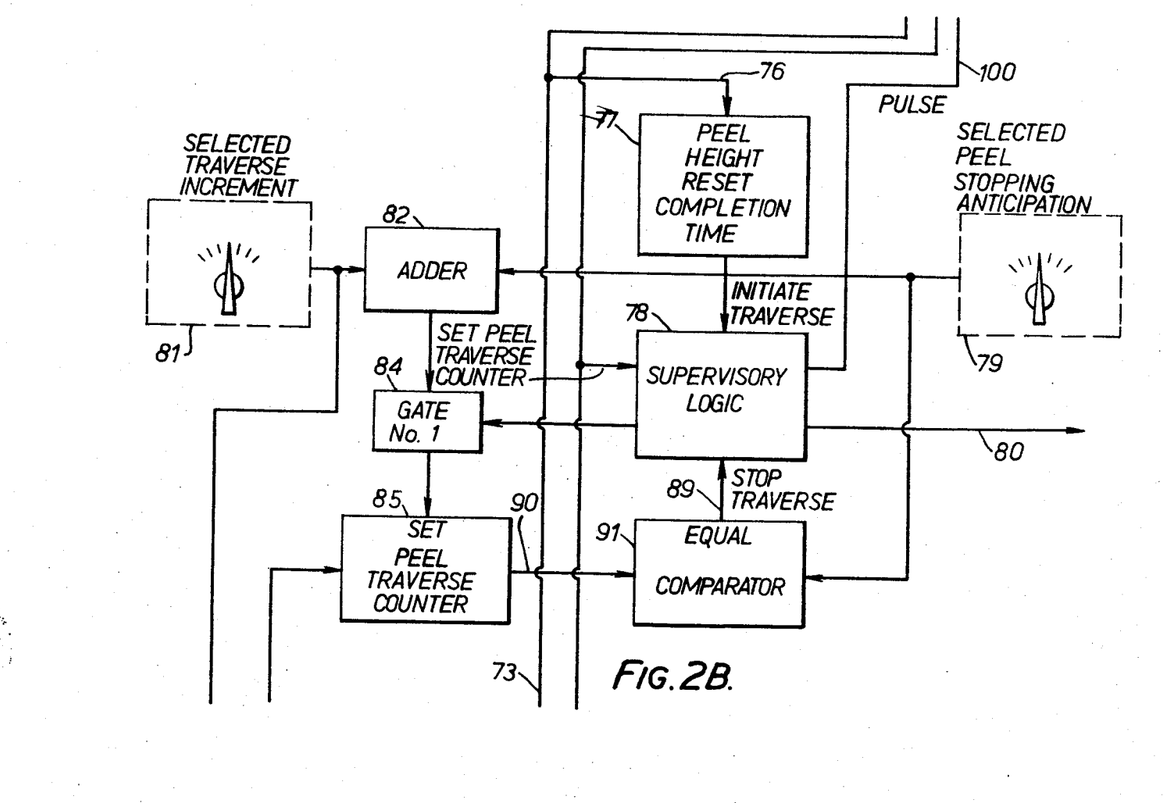
Figure 2C:
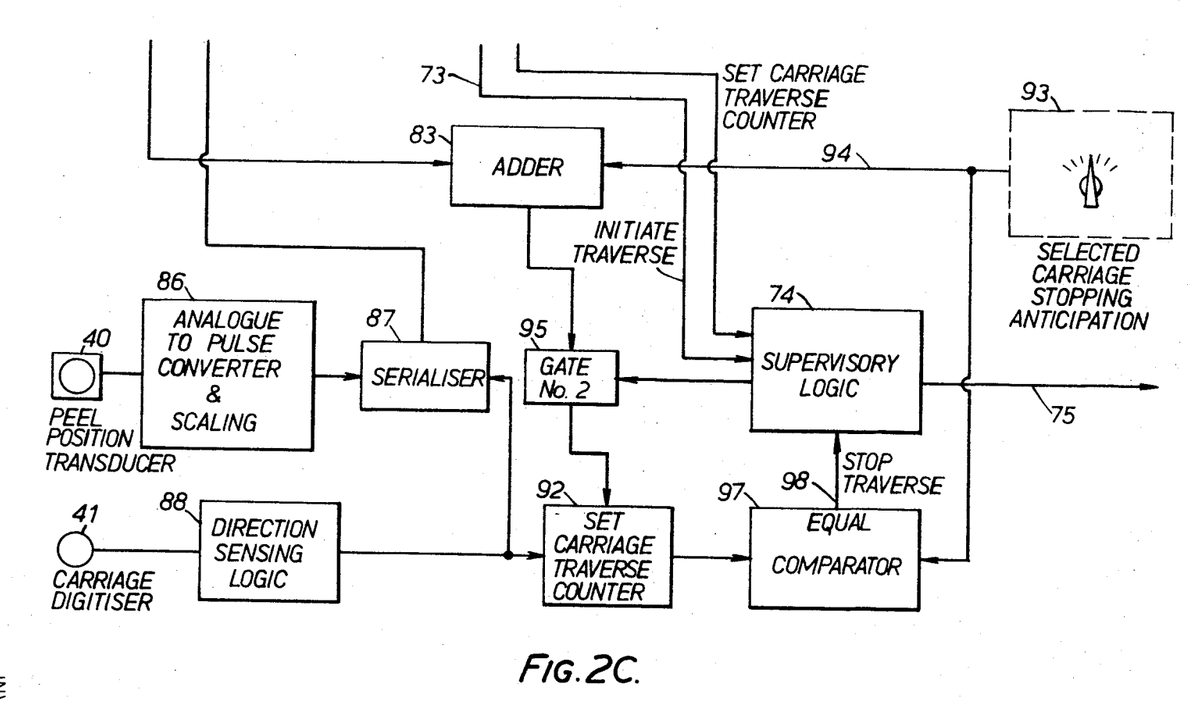

The workpiece is forged along its length in a series of squeezes, being moved through the prescribed bite distance in the forge free periods, i.e., during those periods between successive squeezes during which the workpiece is not gripped by the tools 19, 20. The control system shown in FIG. 2 is designed to effect this movement of the workpiece by initiating movement of the carriage prior to the workpiece being fully released by the tools 19, 20; initiating movement of the peel as soon as the workpiece is free of the tools and causing the peel to move at a higher speed than the carriage speed through the bite distance, overtaking the carriage in the process; keeping the peel stationary in space while the carriage catches up and completes the movement through the bite distance; and then terminating the carriage motion until the next sequence is required for the next forge free period.

The forge control system is of a known type and includes three comparators 50, 51, 52, to which the count of counter 25 is applied. A datum signal representing the required stroke of the press and supplied by device 53 is also applied to comparator 50, the output of which is applied on line 54 to the control circuit 23 to stop the upward movement of the press. Comparator 51 has applied to it a datum signal from a device 55 which is set to a required count, and emits a signal on line 56 to control the control circuit 23 to cause slowdown of the press at the end of the approach movement. A device 57 is set to the required thickness to which the workpiece is to be forged and applies a corresponding datum signal to the comparator 52. This issues a control signal on line 58 to stop further downward movement of the press.

The forging cycle is initiated by energising a line 60 and by operating a forge lever or foot pedal 61. The latter applies a steady signal on a line 62 and generates a pulse on line 63. Lines 60, 62 are connected to an AND gate 64 the output of which is applied on line 65 to energise the pump 42 (FIG. 3). Line 63 is connected to an OR gate 66, the output of which energises a logic circuit 67 and, through line 68, is applied to the control circuit 23 in order to initiate the downward movement of the press.

The press continues to descend until the comparator 51 detects equality between the count in counter 25 and the value set in the device 55. Then, a pulse is applied on line 56 to change the fast lowering of the press to the slow downward movement employed during the actual pressing operation. When the workpiece has been pressed to the required size, comparator 52 emits a signal on line 58 which, firstly, stops the further downward movement of the press and starts the lifting movement. Secondly, the signal is applied on line 70 to the logic circuit 67 to energise the hoist reset circuit 71, causing the peel 33 to be raised and to lift the workpiece clear of the bottom tool 20. Thirdly, the signal is applied on line 73 to a second logic circuit 74, which emits a control signal on line 75 to the solenoids of valves 44 and 47 (Mode 1 above). As a result, the carriage 30 is caused to move away from the press at the preselected speed, while the peel 33 is maintained fixed longitudinally in space. Fourthly, the signal is applied on line 76 to a timing circuit 77 which, after a period of time sufficient to permit the peel to be returned vertically to its datum position, applies a signal to a further logic circuit 78; circuit 78 then emits a signal on line 80 to energise valve 46 and de-energise valve 44 (FIG. 2). Consequently, the peel 33 is accelerated away from the press at a high speed.

The required bite distance or "traverse increment" is set on a switch 81 which applies a signal representing the bite distance in common to two adders 82, 83. A second switch 79 is set to the over-run that will occur at the selected peel speed and applies its output to the adder 82. When the forge lever or foot pedal 61 is operated, the pulse on line 63 is applied to the logic circuit 78 to open a gate 84 and set a peel traverse counter 85 to the sum of the values set on the switches 79, 81.

The output from the peel position transducer 40 is applied to an analogue to pulse converter 86, the pulse output of which is applied to a serialiser 87. Similarly, the pulse output from the carriage transducer 41 is applied through a direction sensing logic circuit 88 to the serialiser 87, the output of which representing the movement of the peel relative to the ground is applied to the counter 85, progressively to decrease the count set into it from the adder 82. The count in counter 85 is applied on line 90 to a comparator 91, to which is also applied the output of switch 79. When the count in counter 85 has been reduced by the movement of the peel relative to ground to the over-run distance set on 79, the comparator passes a signal on line 89 to the logic circuit 78 to terminate the signal on line 80 and de-energise solenoid 46 and energise solenoid 44. As a result, the supply of liquid from the source 45 to the cylinder 36 is stopped and the peel is driven relative to the carriage 30 at the same speed as, but in the opposite direction of the carriage movement, so that the peel 33 remains fixed relative to the ground.

On the receipt of the equality signal on line 89, the logic circuit 78 passes a signal to gate 84 to set again into counter 85 the sum of the bite increment and the overrun distance. As the peel overruns through the overrun distance, the value set into the counter is reduced to the bite increment value. Thus, in the first movement, the peel is moved through a distance equal to the sum of the bite distance and overrun distance, but subsequent movements are through the bite distance only.

While this is happening, the carriage 30 is continuing to move rearwardly by virtue of the supply of liquid from pump 42 to the hydraulic motor 37, the movement being monitored by a carriage monitoring circuit. This circuit comprises a counter 92 which receives the pulse output of the logic circuit 88. A further switch 93 is set to the carriage overrun at the selected speed of movement of the carriage and applies its output on line 94 to the adder 83. On the original operation of the forge lever or foot pedal 61, a signal is applied on line 63 to the circuit 74 to cause a gate 95 to be opened and to set in the counter 92 a value representing the sum of the bite distance set up on switch 81 and the overrun set up on switch 93. This count is progressively reduced during the movement of the carriage and by the pulses from the digitiser 41. The counter is compared in a comparator 97 with the overrun value of switch 93 and, when equality is achieved, a pulse is applied on line 98 to the logic circuit 74 to de-energise the solenoid of valve 43. Consequently, the carriage comes to rest after its over-run.

As in the case of the peel control circuit, the receipt of an equality signal on line 98 causes the logic circuit to apply a signal to open gate 95 again. Thus, in the first carriage movement, the distance traversed is the bite distance plus the overrun distance, while subsequent movements are through the bite distance only.

As soon as the peel 33 has completed its movement through the bite distance, i.e., when the comparator 91 issues a control signal to logic circuit 78, a signal is applied by circuit 78 on line 100 to the OR GATE 66. The output is applied on line 68 to initiate the next reciprocation of the press 12 and is also applied to the logic circuit 67 to de-energise the hoist reset circuit 71 so that the peel can fall as forging progresses. In this way, the press 12 continues to reciprocate, the peel being moved through the prescribed bite distance between each reciprocation, until further movement is stopped.

Figure 4:
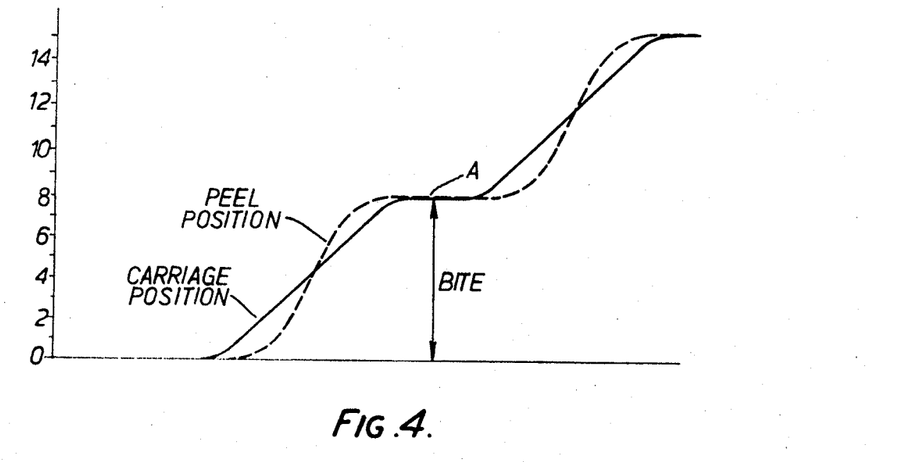
FIG. 4 shows the movements of the manipulator carriage and peel.
Figure 5:
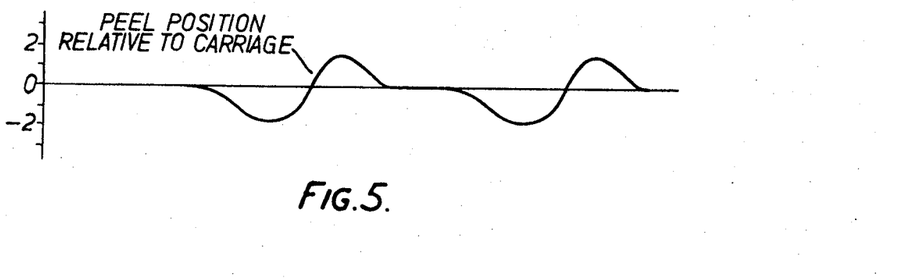
FIG. 5 shows the movement of the peel relative to the carriage.

FIG. 4 shows the movement of the carriage (Shown in full line) and the peel (shown in broken line) both relative to the ground. It will be observed that the peel starts its movement later than the start of the carriage movement, but accelerates rapidly to overtake the carriage, and to complete the bite distance before the carriage does. The peel then stays stationary relative to ground while the carriage catches up. FIG. 5 shows the movement of the peel relative to the carriage and, again, it will be seen that the peel first lags behind the carriage, due to the earlier start of the carriage, but then overtakes the carriage. The peel is of course stationary in space during the squeeze, which occurs at the part marked A.

Figure 6A:
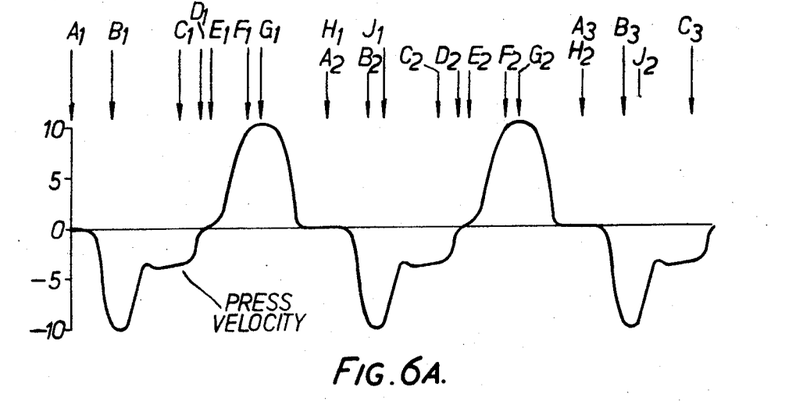
FIGS. 6A, 6B and 6C show the variations in respectively the press velocity, the peel and carriage velocities, and the peel velocity relative to the carriage.
Figure 6B:
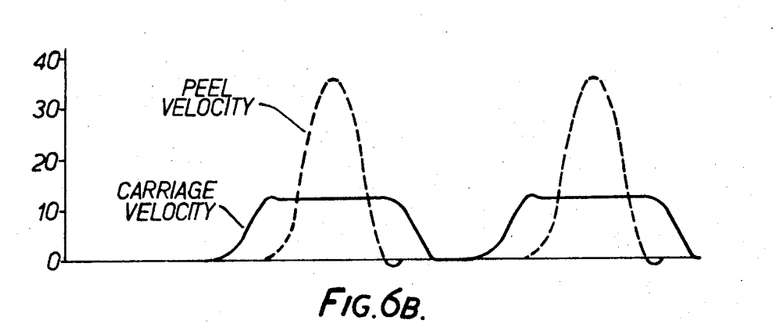
Figure 6C:
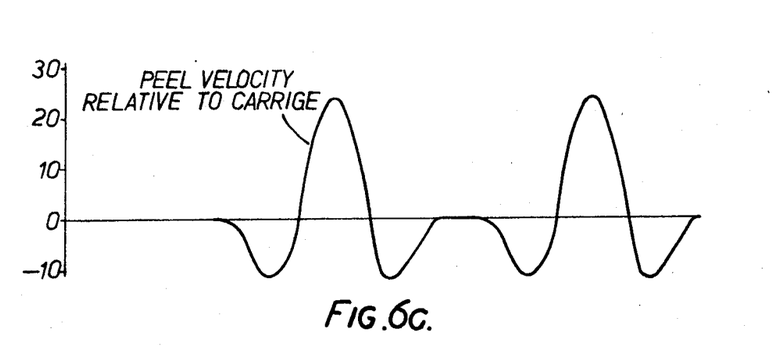

FIGS. 6, A, B and C show on the same time scale (A) the speed of the press, (B) the peel and carriage velocities, the peel velocity being shown in broken line, and (C) the speed of the peel relative to the carriage. On FIG. 6A, the timing of various switching signals are indicated. These are A: the signal on line 68 causing fast downward movement of the press B: the signal on line 56 causing press slowdown C: signal on line 58 causing stopping of downward movement of the press and return D: application of a signal to circuit 71 de-energising the hoist reset.

E: signal on line 75, initiating carriage traverse

F: signal on line 80 initiating recoil of peel 33

G: signal on line 54, terminating return movement of the press

H: signal from comparator 91 to logic circuit 78 terminating the signal on line 80 and stopping peel traverse J: signal on line 98 terminating the signal on line 75 the stopping carriage traverse. The suffices applied to the letters in FIG. 5A refer to the number of the forging cycle. It will be observed that signals A2, B2, i.e., the signals on lines 68 and 56 during the second cycle, appear before J1, the signal terminating the carriage movement of the first cycle. Clearly, the relative timings of A2, B2 and J1 depend on the size of the bite and the speed of the carriage and FIGS. 7A, B and C show different possibilities. In each, the carriage velocity is shown in full line and the peel velocity in dotted line.

Figure 7A:
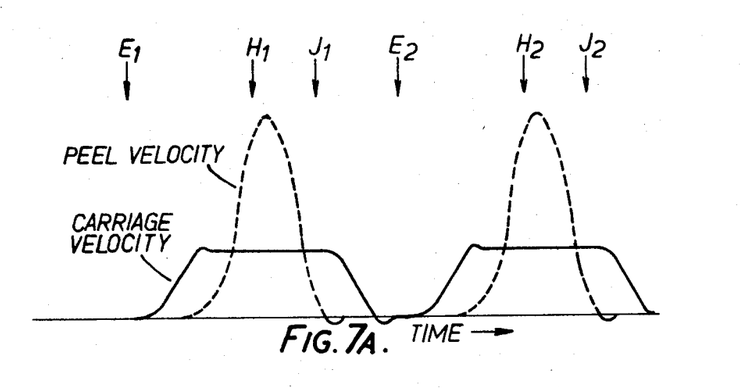
FIGS. 7A, 7B and 7C show the variations in the carriage and peel velocities in three different situations.
Figure 7B:
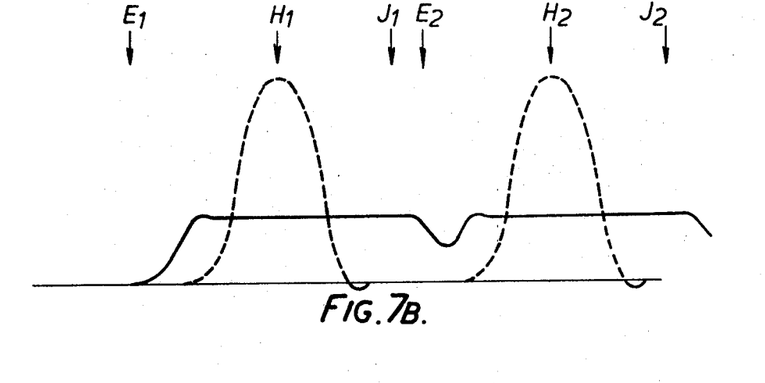
Figure 7C:
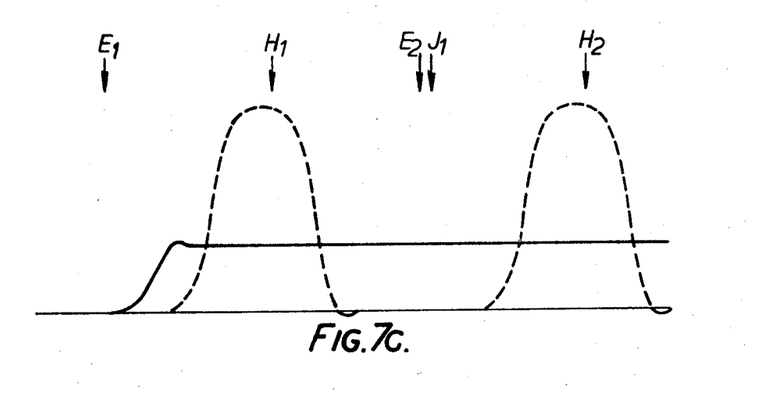

FIG. 7A corresponds to the situation of FIG. 6B where the bite distance is sufficiently small for the carriage to move through that distance in a period not much exceeding the forge free period; consequently, the carriage is allowed to come to rest before reaccelerating for the next forge cycle. As the bite distance increases (with no change in the carriage velocity), the carriage has less time to come to rest at the end of one movement before starting the movement for the next cycle. For example, as shown in FIG. 7B, the carriage traverse is de-energised at the timing point J1, but is re-energised at E2 only a short time thereafter, so that the carriage velocity does not in fact reach zero. In FIG. 7C the bite distance has been so far increased that E2, the energising of the carriage traverse, now occurs before J1, the de-energising of the carriage traverse for the previous cycle. Therefore, the velocity of the carriage remains constant and the carriage moves continuously at constant velocity. The situation of FIG. 7C represents the greatest bite distance for the circuit illustrated. If a larger bite distance is required, it will be necessary to delay the application of signal on line 68 initiating the next forge cycle, until the carriage has moved through the bite distance.

We claim:

1. A method of forging a workpiece in a series of press squeezes displaced along the length of the workpiece by employing a forging press and a manipulator comprising a carriage which is movable towards or away from said press an intermittently operable drive for said carriage, a peel which is mounted on said carriage for movement relative thereto and which carries said workpiece, and means for driving said peel relative to said carriage, the method comprising the steps of a. monitoring the movement of said carriage b. de-energising said drive each time said carriage has moved through the bite distance c. while said workpiece is held by said press, operating said peel driving means to drive said peel relative to the carriage in the direction opposite to the carriage movement and thereby to hold said peel stationary relative to the ground d. on release of said workpiece by said press, operating said peel driving means to drive said peel in the same direction as said carriage at a speed relative to ground higher than the carriage speed e. monitoring the movement of said peel relative to ground f. terminating the operation of said peel driving means when said peel has traversed the bite distance, and g. thereafter, if said carriage is still moving, energising said peel driving means to drive said peel in the direction opposite to the carriage movement to maintain said peel stationary to the ground.

2. A forging method according to claim 1 in which the carriage drive is energised each time the separation of the press tools is initiated.

3. A forging method according to claim 1 in which the movement of the peel relative to the ground is monitored by monitoring the movement of the peel relative to the carriage and comparing the movement of the carriage relative to the ground.

4. A forging method according to claim 1 in which the completion of movement of the peel through the bite distance initiates the next of the press.

5. A forging installation comprising a. a forging press operable to perform a series of press operations on a workpiece, each operation being performed in a press cycle time, b. a manipulator having a carriage movable towards or away from said press, an intermittently operable drive for said carriage, a peel mounted on said carriage for longitudinal movement relative thereto and adapted to support a workpiece and peel driving means for driving said peel relative to said carriage in either direction, and c. a control system including d. means for measuring the movement of said carriage, e. means for measuring the movement of said peel relative to the ground, f. means controlled by said carriage measuring means for operating said carriage drive to drive said carriage through the bite distance during each press cycle time and to deenergise said drive means on completion of the bite distance movement, g. means for energising said peel driving means to drive said peel at the same speed as, but in the opposite direction to, the movement of said carriage while said workpiece is held by said press, h. means controlled by said peel measuring means for operating said peel driving means to drive said peel in the same direction as, but at a higher speed than, said carriage on release of said workpiece by said press, and for terminating the peel movement when said peel has traversed said bite distance, i. means operated when said peel has traversed said bite distance for thereafter operating said peel driving means to drive said peel at the same speed as, but in the opposite direction to, the carriage.

6. A forging installation according to claim 5 in which the means for measuring the peel movement relative to the ground comprises means for detecting the peel movement relative to the carriage and the carriage movement relative to the ground, and means for combining the outputs.

7. A forging installation according to claim 5 in which the control system is so arranged as to initiate the carriage drive prior to the initiation of the peel movement in the same direction.

8. A forging installation according to claim 7 in which the control system includes means for generating a control signal to reverse the press when the workpiece has been forged to the required dimension, and that control signal is applied to initiate carriage movement.

9. A forging installation according to claim 5 in which the means for measuring the movement of the peel relative to ground generates a signal when the peel has moved through the bite distance, and that signal is applied to stop further movement of the peel in that direction and to initiate the next forge cycle.

* * * * *